(12) United States Patent
Grigg

(10) Patent No.: US 10,975,836 B2
(45) Date of Patent: Apr. 13, 2021

(54) SYSTEMS AND METHODS FOR EFFICIENT WATER TURBINE OPERATION

(71) Applicant: Charles Ronald Grigg, Westport, CA (US)

(72) Inventor: Charles Ronald Grigg, Westport, CA (US)

(73) Assignee: Charles Ronald Grigg, Westport, CA (US)

( * ) Notice: Subject to any disclaimer, the term of this patent is extended or adjusted under 35 U.S.C. 154(b) by 40 days.

(21) Appl. No.: 16/447,856

(22) Filed: Jun. 20, 2019

(65) Prior Publication Data

US 2020/0063708 A1 Feb. 27, 2020

Related U.S. Application Data

(60) Provisional application No. 62/720,439, filed on Aug. 21, 2018.

(51) Int. Cl.
*F03B 15/00* (2006.01)
*F03B 13/22* (2006.01)
(Continued)

(52) U.S. Cl.
CPC .............. *F03B 15/00* (2013.01); *B63B 35/44* (2013.01); *F03B 11/008* (2013.01); *F03B 13/22* (2013.01); *B63B 2035/4466* (2013.01); *F03B 13/10* (2013.01); *F05B 2210/11* (2013.01); *F05B 2210/30* (2013.01); *F05B 2220/32* (2013.01); *F05B 2260/80* (2013.01); *F05B 2270/20* (2013.01)

(58) Field of Classification Search
CPC .......... F03B 15/00; F03B 13/22; F03B 13/10; F03B 13/264; B63B 2035/4466; B63B 35/44; B63B 21/50; F05B 2210/30; F05B 2220/32; F05B 2270/20; Y02E 10/20; Y02E 10/30
USPC ...................................................... 290/42, 53
See application file for complete search history.

(56) References Cited

U.S. PATENT DOCUMENTS 8,373,297 B2  2/2013  Grigg
9,284,959 B2  3/2016  Grigg
(Continued)

FOREIGN PATENT DOCUMENTS

GB           2530442 A  *  3/2016  .............. F03B 13/10
WO    WO-2017160216 A1 *  9/2017  .............. B63B 21/50

*Primary Examiner* — Charles Reid, Jr.
(74) *Attorney, Agent, or Firm* — Vierra Magen Marcus LLP

(57) ABSTRACT

A system includes a water turbine, a plurality of positioning winches coupled to the water turbine and a plurality of positioning cables. An individual positioning cable extends between a fixed point at a first end and the water turbine at a second end and is coupled to a corresponding positioning winch that is configured to extend and retract the individual positioning cable between the fixed point and the water turbine. A plurality of sensors is configured to sense water conditions around the water turbine. A position control system is connected to the plurality of positioning winches and connected to the plurality of sensors. The position control system is configured to position the water turbine using the plurality of positioning winches according to the water conditions sensed by the plurality of sensors.

17 Claims, 10 Drawing Sheets

(51) Int. Cl.
*F03B 11/00* (2006.01)
*B63B 35/44* (2006.01)
*F03B 13/10* (2006.01)

(56) References Cited

U.S. PATENT DOCUMENTS

| | | | | |
|---|---|---|---|---|
| 2010/0025996 | A1* | 2/2010 | Edwards | F03B 13/142 |
| | | | | 290/44 |
| 2010/0181774 | A1* | 7/2010 | Dehlsen | B63B 22/18 |
| | | | | 290/54 |
| 2010/0219645 | A1* | 9/2010 | Yamamoto | F03D 13/40 |
| | | | | 290/55 |
| 2010/0326343 | A1* | 12/2010 | Hunt | B63B 21/50 |
| | | | | 114/293 |
| 2011/0037264 | A1* | 2/2011 | Roddier | F03D 9/25 |
| | | | | 290/44 |
| 2011/0066401 | A1* | 3/2011 | Yang | G01S 3/781 |
| | | | | 702/184 |
| 2012/0065788 | A1* | 3/2012 | Harper, III | G01W 1/10 |
| | | | | 700/291 |
| 2013/0307274 | A1* | 11/2013 | Sia | F03B 17/06 |
| | | | | 290/55 |
| 2018/0106236 | A1* | 4/2018 | Lee | B63B 21/50 |
| 2018/0313339 | A1* | 11/2018 | Stevens | F03G 3/00 |
| 2019/0063395 | A1* | 2/2019 | Hagmuller | F03B 17/02 |
| 2019/0329846 | A1* | 10/2019 | Hayman | B63B 35/44 |

* cited by examiner

SYSTEMS AND METHODS FOR EFFICIENT WATER TURBINE OPERATION

PRIORITY CLAIM

This application claims the benefit of U.S. Provisional Patent Application No. 62/720,439, filed on Aug. 21, 2018, which is hereby incorporated by reference in its entirety.

BACKGROUND

The present disclosure relates to technology for operating water turbines including for harnessing wave power.

Water turbines may be used to harness the power of moving water. This may include placing a water turbine in water where there is a current, e.g. in a river or estuary, or where there are waves, e.g. in the ocean. Wave power has been proposed as a source of renewable energy that is available in abundance in many coastal areas. Harnessing wave energy efficiently using a water turbine is challenging for a number of reasons including harsh maritime environments and variability of wave conditions, which may produce large forces. Increasing efficiency of wave energy systems can provide more energy from an installation and/or allow use of smaller installations to meet a given power requirement.

SUMMARY

An example of system includes a water turbine, a plurality of positioning winches coupled to the water turbine, and a plurality of positioning cables. An individual positioning cable extends between a fixed point at a first end and the water turbine at a second end and is coupled to a corresponding positioning winch that is configured to extend and retract the individual positioning cable between the fixed point and the water turbine. A plurality of sensors are configured to sense water conditions around the water turbine. A position control system is connected to the plurality of positioning winches and connected to the plurality of sensors, the position control system configured to position the water turbine using the plurality of positioning winches according to the water conditions sensed by the plurality of sensors.

The plurality of positioning winches may be configured in pairs and the position control system may be configured to position the water turbine by extending a portion of positioning cable from a first winch of a pair and retracting a corresponding portion of positioning cable from a second winch of the pair. The plurality of sensors may be configured to sense at least one of: wave direction and amplitude at one or more locations at or near the water turbine, and wherein the position control system is configured to position the water turbine in at least one of: a location of high sensed wave amplitude and an orientation facing a sensed wave direction. The plurality of sensors may be configured to sense at least one of: water current velocity and water current direction at one or more locations at or near the water turbine and the position control system may be configured to position the water turbine in at least one of: a location of high current velocity and an orientation facing water current. The plurality of sensors may include one or more acoustic sensors configured to detect foreign objects including at least one of: debris, boats, fish, sea mammals, swimmers, and divers, the system may be configured to respond to detection of foreign objects by one or more of: an alarm, movement of the water turbine, and shut-down of the water turbine. The system may include a Global Positioning System (GPS) circuit connected to the position control system, the GPS circuit configured to provide position information to the position control system. The system may include a recording circuit configured to record water turbine power output information for different water conditions and different water turbine positions, a power output prediction circuit configured to predict turbine power outputs for different water conditions and different water turbine positions, and the position control system may be configured to position the water turbine according to predicted turbine outputs for present water conditions and different water turbine positions including moving the water turbine from a position of low predicted power output to a position of high predicted power output for present water conditions. The system may include a plurality of retractable legs attached to the water turbine, the water turbine configured to float when the plurality of retractable legs are retracted and the plurality of retractable legs configured to engage a sea-floor surface in an extended position. The retractable legs may be further adjustable to vary water turbine height above a sea-floor and the position control system may be configured to position the water turbine height using the retractable legs from a height of low predicted power to a height of high predicted power. The system may include a power storage module coupled to the water turbine, the power storage module comprising at least one of: a flywheel, an electrical generator and battery, a water pump and reservoir, and an air compressor.

An example of a method of generating power includes: positioning a water turbine in a body of water using a plurality of positioning cables coupled to the water turbine and a plurality of positioning winches, an individual positioning cable attached to a fixed point at a first end and attached to the water turbine at a second end, a length of positioning cable between the first end and the second end controlled by a corresponding positioning winch; sensing water conditions around the water turbine; and repositioning the water turbine using the plurality of positioning winches according to sensed water conditions to thereby reposition the water turbine from a position of low power output to a position of high power output.

Sensing water conditions around the water turbine may include sensing at least one of: wave direction and amplitude at one or more locations at or near the water turbine, and repositioning the water turbine to a position of high power output may include at least one of repositioning to: a location of high sensed wave amplitude and an orientation facing a sensed wave direction. Sensing water conditions around the water turbine may include sensing at least one of: water current velocity and water current direction at one or more locations at or near the water turbine and wherein repositioning the water turbine to a position of high power output includes at least one of repositioning to: a location of high current velocity and an orientation facing water current. The method may include recording water turbine power output information for different water conditions and different water turbine positions; predicting water turbine power outputs for different water conditions and different water turbine positions from recorded water turbine power output information; and repositioning the water turbine according to predicted water turbine power outputs for present water conditions and different water turbine positions including moving the water turbine from a position of low predicted power output to a position of high predicted power output for present conditions. The method may further include retracting a plurality of retractable legs attached to the water turbine for repositioning of the water turbine; and extending the plurality of retractable legs to engage a sea-floor surface for operation of the water turbine. Repositioning the water turbine may include varying water turbine height above the sea-floor surface using the retractable legs according to sensed water conditions. The method may include storing power generated by the water turbine using at least one of: a flywheel, an electrical generator and battery, a capacitor, a water pump and reservoir, and an air compressor and reservoir and subsequently sending stored power to a shore-location.

An example of a system includes a water turbine; a plurality of positioning winches attached to the water turbine; a plurality of positioning cables, an individual positioning cable attached to a fixed point at a first end and attached to the water turbine at a second end, a length of the individual positioning cable extending between the fixed point and the water turbine controlled by a corresponding positioning winch; a plurality of sensors configured to sense water conditions around the water turbine; a recording circuit configured to record water turbine power output information for different water conditions and different water turbine positions; a power output prediction circuit configured to predict water turbine power outputs for different water conditions and different water turbine positions from information recorded by the recording circuit; and a position control system coupled to control the plurality of positioning winches to reposition the water turbine from a position of low predicted power output to a position of high predicted power output for present water conditions according to predictions of the power output prediction circuit for present water conditions.

The system may include a plurality of retractable legs attached to the water turbine, the water turbine configured to float when the plurality of retractable legs are retracted, the plurality of retractable legs configured to engage a sea-floor surface in an extended position, the retractable legs are further adjustable in the extended position to vary water turbine height above a sea-floor surface and wherein the position control system is configured to reposition the water turbine height using the retractable legs and/or other components to position the water turbine in an optimum location. The plurality of sensors may include one or more of: a sea-floor sensor that senses conditions on the sea-floor, a mid-water sensor that senses conditions between the sea-floor and the surface, and a water-surface sensor positioned at or near the surface to sense conditions at the surface of the water, conditions include one or more of water pressure, temperature, salinity, water current velocity and direction.

DETAILED DESCRIPTION

Certain embodiments of the present technology described herein relate systems for harnessing water power including wave power in efficient ways. For example, the position, including location and orientation, of a water turbine may be changed according to changing wave conditions so that such a wave power system operates in an efficient mode throughout a range of different conditions (e.g. different wave directions, different wave amplitude, different tide levels, etc.). Similarly, a water turbine in a current may be repositioned as water flow changes, e.g. as the tide changes and the path of strongest current shifts.

A water power system may include a water turbine and sensors to sense water conditions around the water turbine (e.g. to sense wave direction and amplitude and/or water current velocity and water current direction at one or more locations at or near the water turbine). A system of positioning winches and cables may be attached to the water turbine and to fixed points about the water turbine. Positioning winches (or "smart winches") may be centrally controlled to facilitate repositioning of the water turbine from one location to another and/or from one orientation to another. For example a position control system may control the positioning winches to extend and retract positioning cables to reposition the water turbine to a position that provides improved power output (a "sweet spot"). The position control system may receive input from one or more sensors providing information about present water conditions around the water turbine. Based on the present information, a model may be used to identify improved positioning for the water turbine (e.g. positioning that results in higher power output). The model may be generated from measured power output of the wave turbine at different locations and in different water conditions over a period of time. Thus, the model may be updated over time to adjust to changing conditions (e.g. shifting sea-floor contours, different currents, etc.) and may be a dynamic model rather than a static model.

Figure 1:
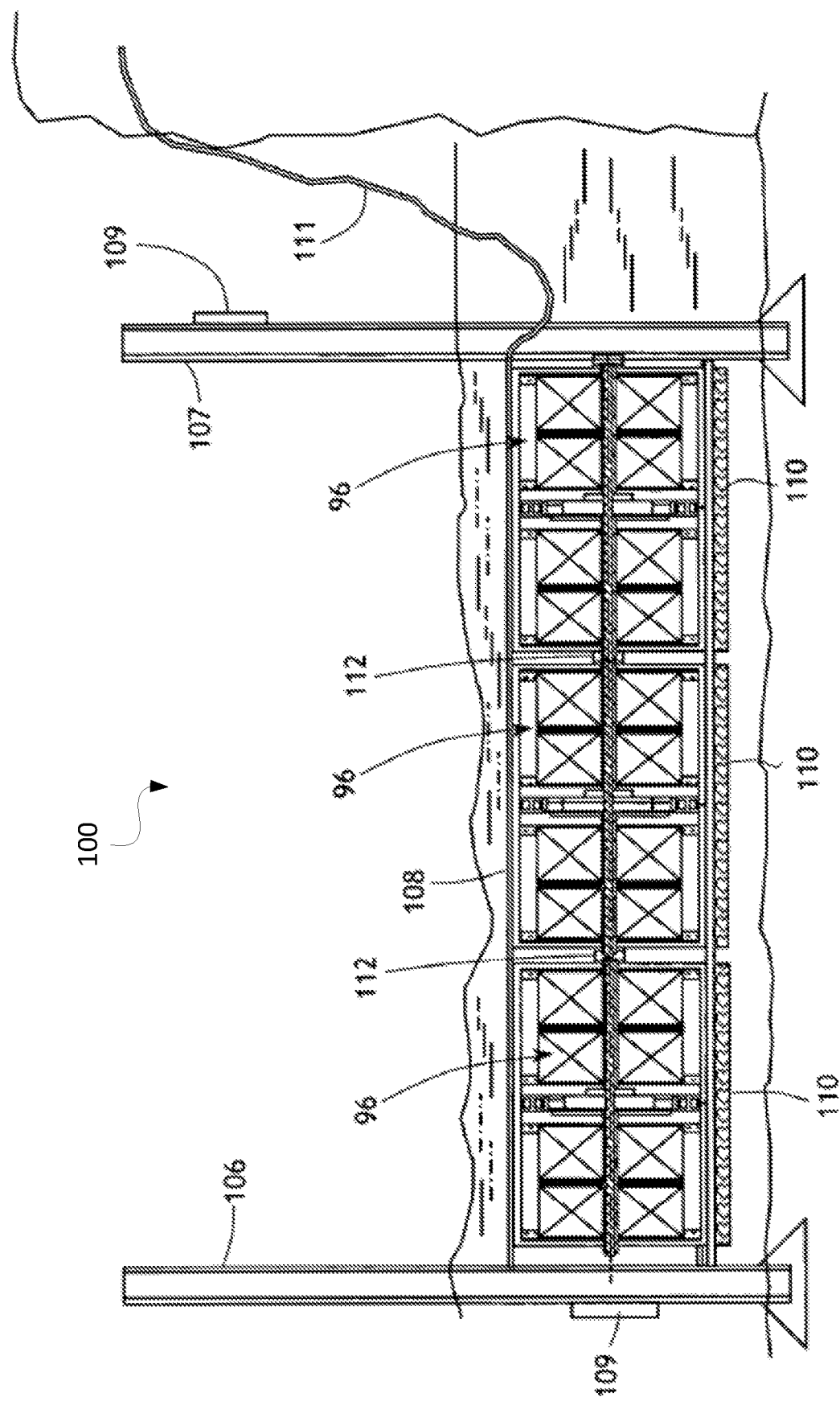
FIG. 1 illustrates an example of a water turbine.

FIG. 1 shows an example of a water turbine positioned in a body of water (e.g. river or ocean) in order to harness water power (e.g. current or wave power). Water turbine 100 includes individual turbines 96 coupled together with intermediate universal joints 112. Lateral supports 108 extend between legs 106, 107 (also referred to as "stanchions"). Buoyancy chambers 110 (one per individual turbine 96 in this example) may be used to provide neutral buoyancy and/or to make water turbine 100 float, or sink, as desired. Motor drive system 109 includes components engaging legs 106 and 107 to facilitate retraction and extension of legs 106, 107. Thus, legs 106, 107, may be considered extendable legs and may be used to anchor water turbine 100 in place for power generation (e.g. in current and/or waves). A cable 111 feeds electricity from a generator (not shown) in water turbine 100 to consuming devices and customers on land (and may also power motor drive system 109 and/or other components of water turbine 100). Various aspects of water turbines including counter-balancing torque features are described in U.S. Pat. No. 8,373,297, which issued on Feb. 12, 2013, and which is hereby incorporated by reference in its entirety. Various aspects of turbines are also disclosed in U.S. Pat. No. 9,284,959, which issued on Mar. 15, 2016, and which is hereby incorporated by reference in its entirety.

Figure 2A:
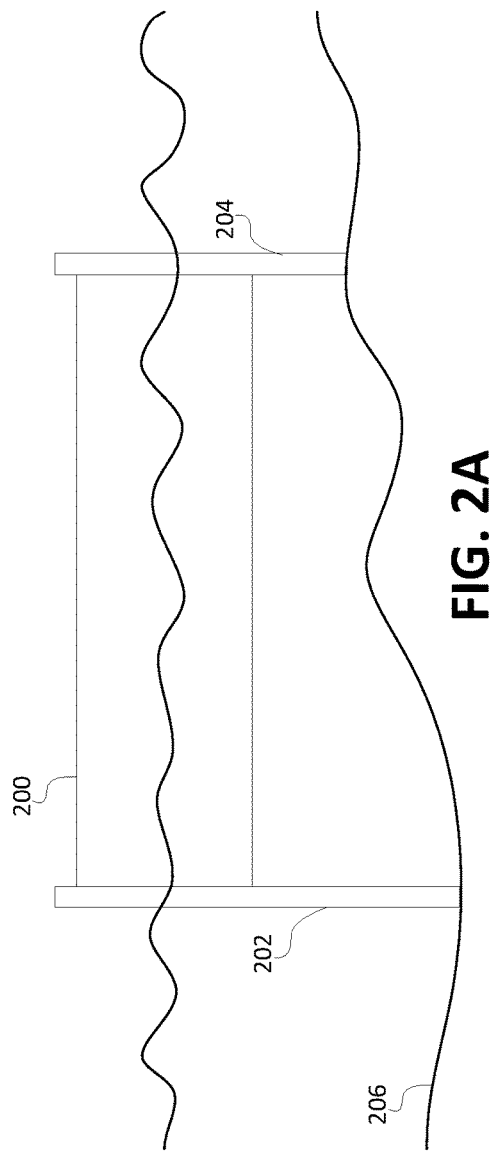
FIGS. 2A-B illustrate an example of retractable legs of a water turbine.
Figure 2B:
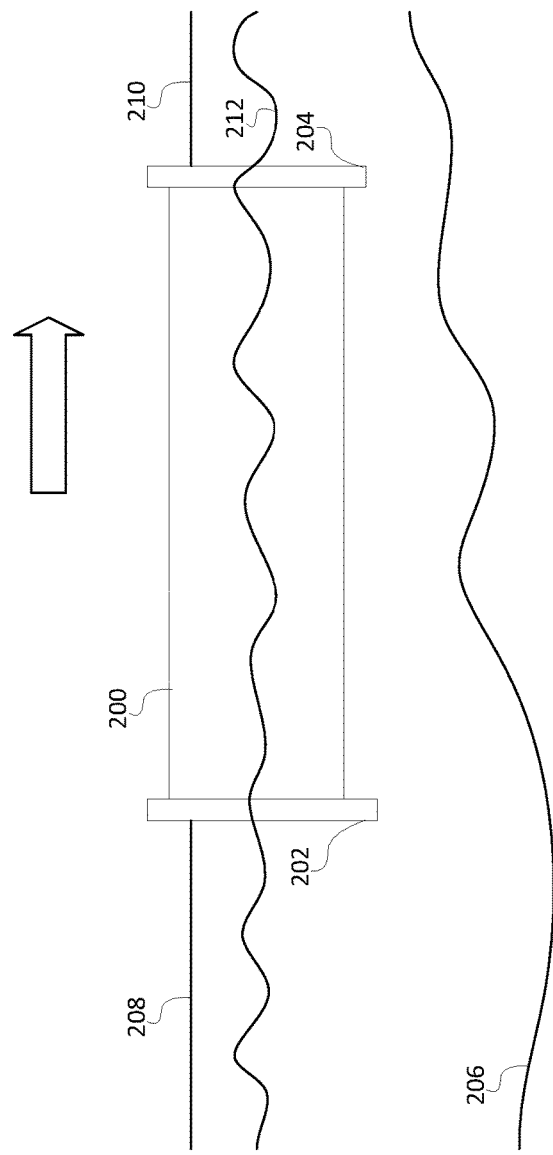

FIGS. 2A-2B illustrate an example of how a water turbine 200 (e.g. water turbine 100 of FIG. 1) may be repositioned. In FIG. 2A, water turbine 200 is coupled to the sea-floor 206 by extendable legs 202, 204. In this configuration or mode (extended position, with extendable legs 202, 204 in contact with the sea-floor surface), water turbine 200 may operate to generate power as water flow and/or wave action turns individual turbines of water turbine 200 to generate electrical power. Extendable legs 202, 204 (retractable legs) are further adjustable to vary water turbine height above the sea-floor, e.g. to adjust to tides and/or to move to a height that provides higher power.

FIG. 2B illustrates water turbine 200 with extendable legs 202, 204 in the retracted position so that they are clear of sea-floor 206 thus allowing water turbine 200 to be moved. Buoyancy chambers 110 may be filled with air in this configuration or mode, thus allowing water turbine 200 to be easily moved laterally to a new location. Positioning cables 208, 210 are attached to water turbine 200 and are also attached to fixed points that are remote from water turbine 200 (e.g. points on land, pilings or anchors in the sea, or other fixed points). Positioning cables 208, 210 may be used to move water turbine 200 laterally along the surface 212. For example, in FIG. 2B, water turbine 200 is moved to the right (indicated by arrow) by increasing tension in positioning cable 210 and decreasing tension in positioning cable 208. This may be achieved using positioning winches (not shown in FIGS. 2A-B) that are configured to extend and retract positioning cables 208, 210. Thus, two or more positioning winches may be controlled to reposition wave turbine 200 as needed.

Figure 3A:
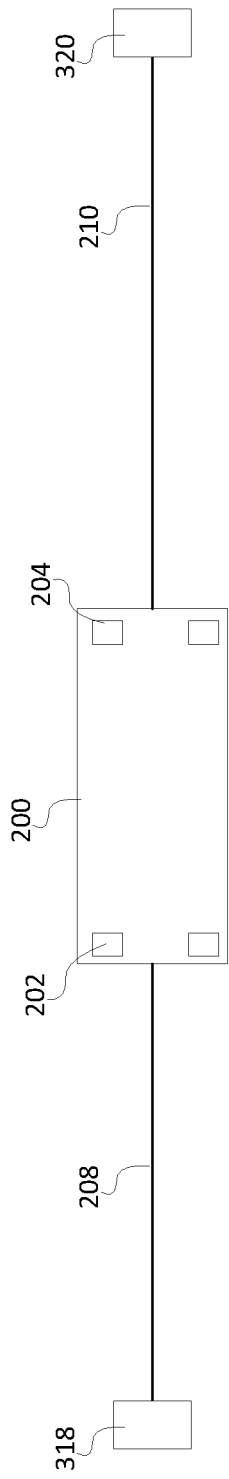
FIGS. 3A-B illustrate an example of relocation of a water turbine.
Figure 3B:
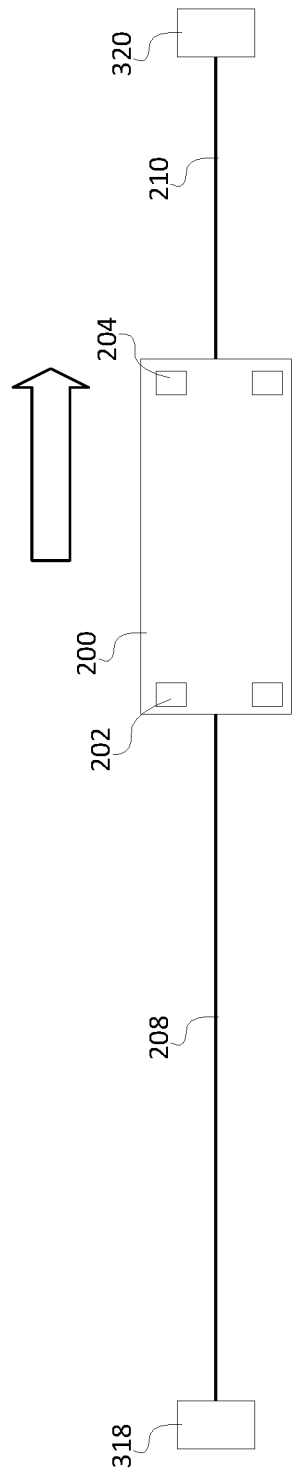

FIGS. 3A-3B show a top-down view of repositioning of wave turbine 200 as illustrated in FIGS. 2A-B including positioning winches 318, 320, coupled to positioning cables 208, 210 respectively. FIG. 3A shows water turbine in an operational configuration as shown in FIG. 2A (e.g. with extendable legs 202, 204 extended). In order to move water turbine 200 as shown in FIG. 3A, extendable legs 202, 204 (and any additional extendable legs) are retracted to clear the sea-floor and tension in positioning cables is used to move water turbine 200. Specifically, in the example of FIG. 3A, positioning winch 318 extends, or pays-out, positioning cable 208 thereby reducing tension in positioning cable 208. Positioning winch 320 retracts, or winds-in, positioning cable 210 thereby increasing tension in positioning cable 210. This causes water turbine 200 to move to the right as shown. Positioning winches 318, 320 are configured as a pair and are operated to position the water turbine by extending a portion of one positioning cable from a first winch of the pair and retracting a corresponding portion of the other positioning cable from a second winch of the pair. Other positioning winches may be similarly configured in pairs. While positioning winches may be actively driven (e.g. by electric motors, hydraulic actuators, pneumatic actuators, or other components) positioning winches may be managed so that they take in slack line (e.g. using a ratchet or other passive mechanism) in an opportunistic manner as current or waves move a wave turbine rather than using electrical or other power alone to apply a high load to a positioning line. In many instances this passive opportunistic approach may be sufficient to achieve all movement of a wave turbine to be in a desirable location as conditions change and such a "sweet spot" moves. In some cases wave and/or current power may be sufficient to move a water turbine, while in other cases, some or all force may be provided by driving positioning winches. In some cases, non-electric components (e.g. pneumatic or hydraulic) may be used rather than electric components in a wave turbine system to reduce risk of electrical problems from water intrusion and corrosion in a marine environment.

While a single pair of opposed positioning winches may be used to move a water turbine laterally in a simple manner in one dimension, more complex positioning may also be achieved using more than two positioning cables to move a water turbine in two dimensions along the water surface. Additionally, using extendable legs and/or buoyancy chambers and/or pontoons (e.g. displaced laterally from the water turbine) may allow vertical positioning of a water turbine so that the positioning of a water turbine in three dimensions can be achieved.

Figure 4:
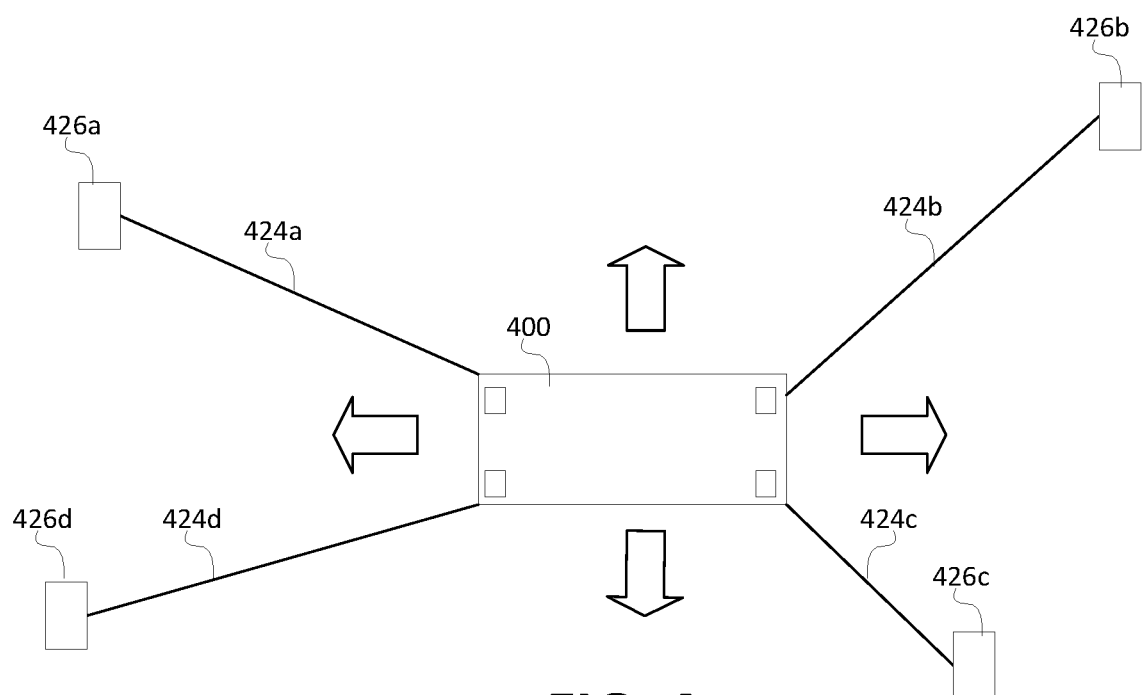
FIG. 4 shows an example of a water turbine located using positioning cables.

FIG. 4 shows an example of a water turbine 400 (e.g. as shown in FIG. 1) with four positioning cables 424a-d extending from water turbine 400 to allow movement in two dimensions (e.g. laterally and vertically in the top-down view of FIG. 4). Positioning winches 426a-d are coupled to positioning cables 424a-d respectively to extend and retract positioning cables 424a-d as needed to move water turbine 400.

While positioning winches 426a-d of FIG. 4 are located remotely from water turbine 400 (e.g. on land, on the sea bottom, or moored at or below the sea surface), positioning winches may also be located on a water turbine (i.e. positioning winches may be permanently attached to a water turbine to extend and retract positioning cables from the water turbine side). Furthermore, while FIG. 4 shows each positioning winch 426a-d coupled to a single corresponding positioning cable 424a-d, in some cases two or more positioning cables may be coupled to a single positioning winch (e.g. winch with two or more separately operable drums to separately control different positioning cables, or a common drum used for two or more cables).

Figure 5:
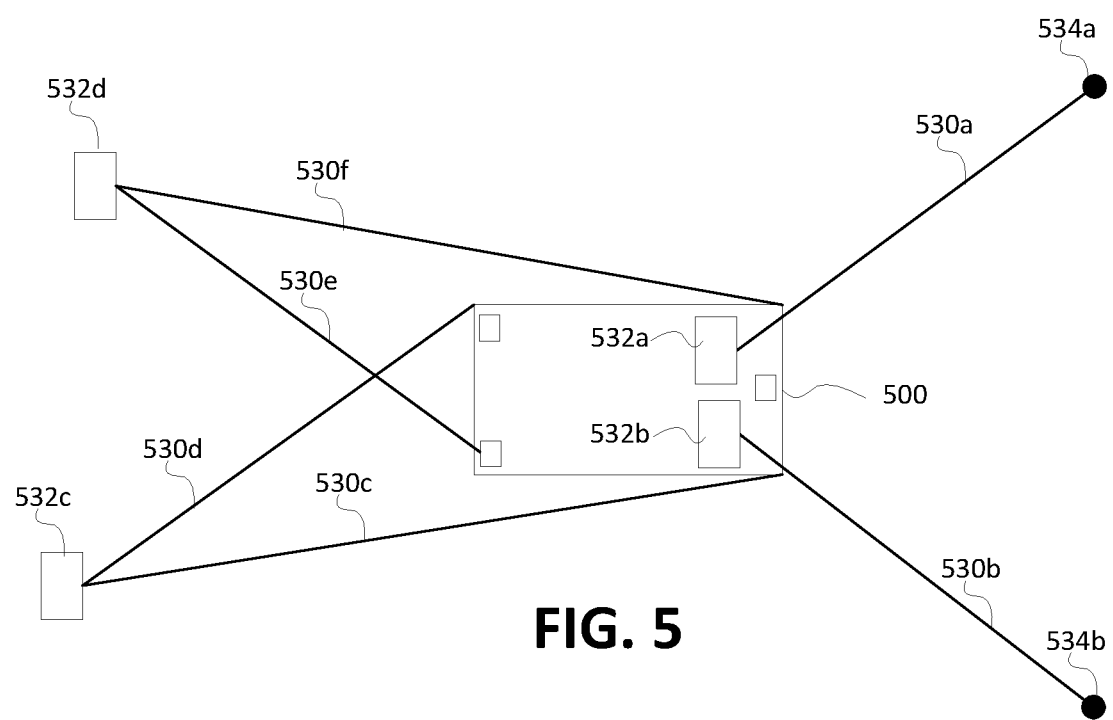
FIG. 5 shows another example of a water turbine located using positioning cables.

FIG. 5 shows an example of a water turbine 500 with six positioning cables 530a-f controlled by four positioning winches 532a-d. Positioning winches 532a-b are located on water turbine 500 and may be powered by water turbine 500 directly. Corresponding positioning cables 530a-b terminate at fixed points 534a-b, which may be pilings, anchors, or other fixtures in, on, or under the sea or on land. Locating positioning winches on water turbine 500 may avoid locating positioning winches in difficult-to-access locations (e.g. on the sea-floor). Positioning winches 532c-d each control two positioning cables, which may be wound on different drums or the same drum. For example, where positioning cables 530c-d are wound on different drums of positioning winch 532c, this may allow torque to be applied to water turbine 500 by positioning winch 532c so that the orientation of water turbine 500 may be changed. Thus, positioning winches 532c-d may be used to reposition water turbine 500 in both location and orientation.

Figure 6A:
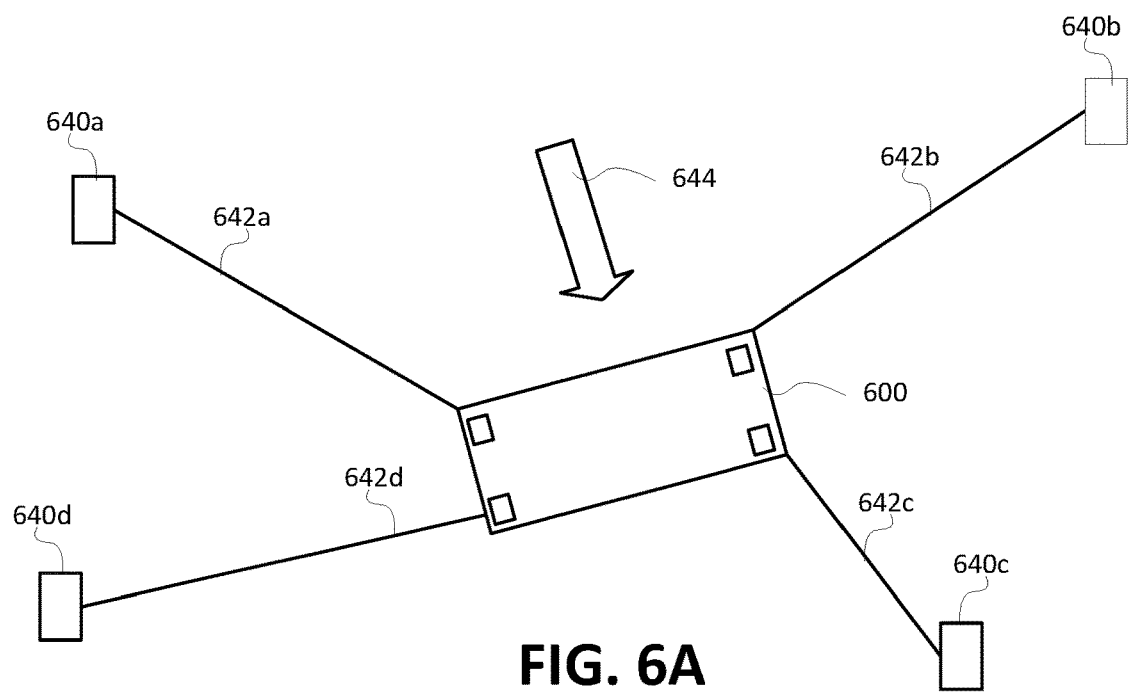
FIGS. 6A-B illustrate an example of changing orientation of a water turbine.
Figure 6B:
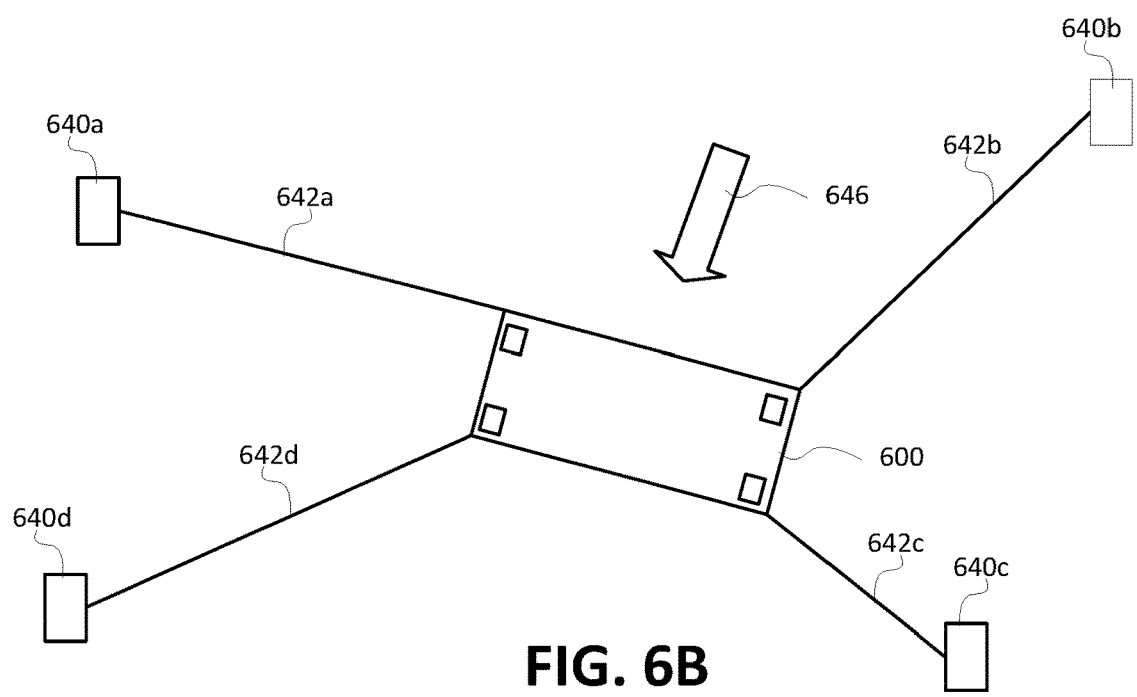

FIGS. 6A-B illustrate an example of how orientation of a water turbine 600 may be changed using repositioning winches 640a-d and corresponding repositioning cables 642a-d. In FIG. 6A, water turbine 600 is orientated to face current/wave direction 644. For example, a water turbine may be orientated so that its axis of rotation is perpendicular to the direction of water flow or wave travel. As conditions change, current/wave direction may change so that a water turbine may not be optimally orientated unless it is repositioned. FIG. 6B shows water turbine 600 after repositioning to orient water turbine 600 according to new current/wave direction 646. For example, positioning winches 640*a* and 640*c* may retract respective positioning cables 642*a*, 642*c*, while positioning winches 640*d*, 640*b* extend respective positioning cables 642*d*, 642*b*.

In order to reposition a wave turbine according to conditions some information about present conditions may be obtained using sensors that send real-time data regarding various conditions such as wave height, wave frequency, wavelength, wave orientation, water current velocity, water current direction, water depth, water temperature, surface conditions, and sub-surface conditions. Additional conditions may also be sensed such as presence of foreign objects in the water, positioning cable tension, and power output of a water turbine. Some or all of such data may be provided to a central location where it may be used to determine how to manage a water turbine, including whether to reposition the water turbine and, if so, how it should be repositioned.

Figure 7:
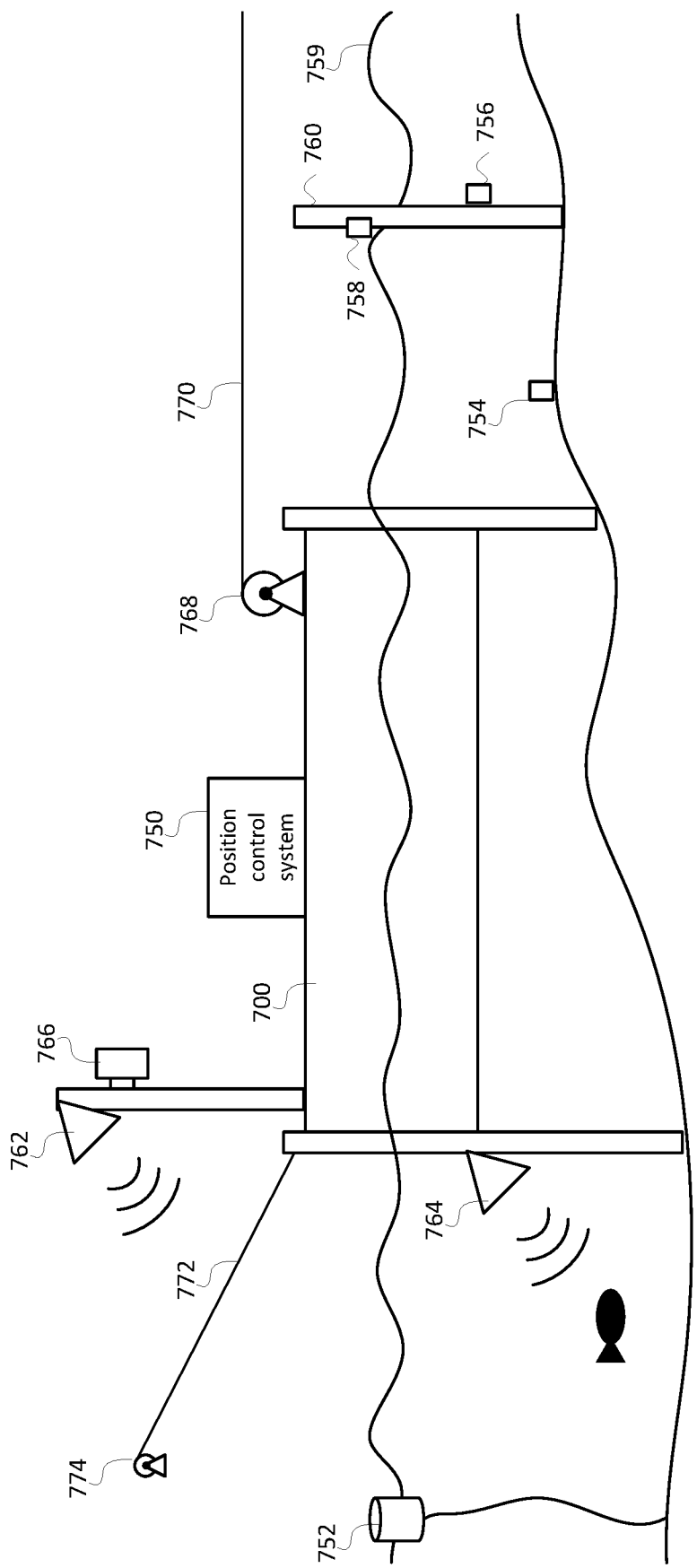
FIG. 7 illustrates examples of sensors coupled to a water turbine.

FIG. 7 shows an example of a water turbine 700 (wave turbine) that includes a position control system 750, which receives input in real-time from a plurality of sensors and uses the input for repositioning of water turbine 700. Sensors may be located on or near a water turbine to gather data regarding water conditions around the water turbine. For example, sensor 752 is a buoy sensor that floats near water turbine 700 to gather water surface data such as wave height, wave frequency, etc. Sensor 754 is a sea-floor sensor that senses conditions on the sea-floor such as water pressure, temperature, salinity, water current velocity and direction, etc. Sensor 756 is a mid-water sensor that senses conditions between the bottom and the surface of the water, e.g. water pressure, temperature, salinity, water current velocity and direction, etc. Sensor 758 is a water-surface sensor positioned at or near the water surface 759 to sense conditions at the surface of the water, such as water temperature, salinity, water current velocity and direction, etc. Sensors 756 and 758 are attached to piling 760, while in other examples, such sensors may be attached to buoys or otherwise positioned. Sensor 762 is mounted on water turbine 700 to observe the water surface around water turbine 700. For example, sensor 762 may include a camera (infrared, visible, or other wavelength), radar imaging circuit, and/or sonic imaging circuit. Such a sensor may provide information regarding water surface conditions around water turbine 700 including wave height, wave length, wave frequency, wave direction, and other information such as detecting the presence of foreign bodies on the surface (e.g. debris, swimmers, boats, etc., which may trigger an alarm or shut-down). Sensor 764 is an underwater sensor that may include a camera, radar unit, or sonic unit (acoustic sensors such as a fish finder type detector) to detect conditions underwater including current velocity and direction, presence of foreign objects (e.g. divers, fish, sea mammals, which may trigger an alarm or shut-down). Sensor 766 is a position sensor configured to provide position data regarding the location and orientation of water turbine 700. For example, sensor 766 may include a Global Positioning System (GPS) antenna and circuit to obtain position information from satellites. Positioning winch 768 includes one or more sensors to sense the load on positioning winch 768 (tension in positioning cable 770). Positioning cable 772 includes one or more tension sensors to sense tension in positioning cable 772, which extends to a remote positioning winch 774. It may be more practical to measure tension in a positioning cable rather than a positioning winch, particularly for remote winches. While a few examples of sensors are shown in FIG. 7, it will be understood that various other sensors may be used and that the present technology is not limited to any particular sensors or any particular number or arrangement of sensors.

Figure 8:
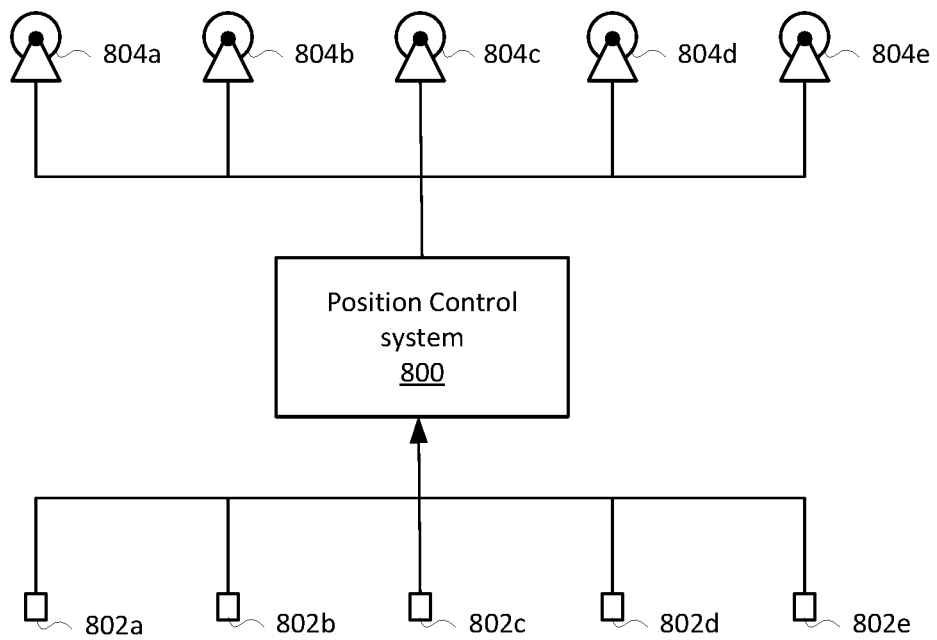
FIG. 8 illustrates an example of coupling of a position control system.

FIG. 8 shows an example of a position control system 800 that may be used to position a water turbine (e.g. may be used as position control system 750 to position water turbine 700). Position control system 800 receives input from a plurality of sensors 802*a-e*, which may include real-time water condition data. Position control system 800 provides outputs to a plurality of positioning winches 804*a-e* based on inputs from sensors 802*a-e*. For example, position control system 800 may send outputs to positioning winches 804*a-e* to cause positioning winches 804*a-e* to move a wave turbine from a location where power output of the water turbine is low to another location where the power output of the water turbine is higher based on the water conditions indicated by sensors 802*a-e*. Position control system 800 may be considered an example of a position control system connected to a plurality of positioning winches 804*a-e* and connected to plurality of sensors 802*a-e*, and configured to position a water turbine using the plurality of positioning winches 804*a-e* according to the water conditions sensed by the plurality of sensors 802*a-e*.

Figure 9:
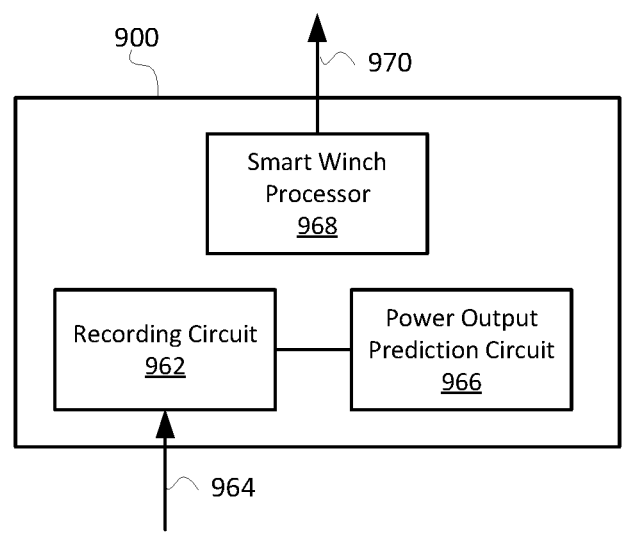
FIG. 9 illustrates an example of components of a position control system.

An example implementation of a position control system (e.g. position control system 800) is position control system 900 of FIG. 9. Position control system 900 includes a recording circuit 962 configured to record water turbine power output information for different water conditions and different water turbine positions. Recording circuit 962 has an input 964 from a plurality of sensors including a sensor for water turbine power output, one or more sensors for water conditions (e.g. wave conditions, current conditions), and a position sensor (e.g. GPS circuit). Recording circuit 962 may record water turbine power output over at different positions and over a range of different water conditions.

Power output prediction circuit 966 is configured to predict turbine power outputs for different water conditions and different water turbine positions. In particular, power output prediction circuit 966 may use a model of power output as a function of water conditions and water turbine position to predict power output at one or more different locations for a given set of conditions (e.g. present conditions). The model may be based on data recorded by recording circuit 962 so that the model is adaptive over time and a wave turbine may improve its performance (provide better predictions) in a given area as its power output prediction circuit improves the model. The model may be generated by machine learning or other appropriate technique.

Position control system 900 may be configured to position the water turbine according to predicted water turbine outputs for present water conditions and different water turbine positions. This may include moving the water turbine from a position of low predicted power output to a position of high predicted power output for present water conditions. A smart winch processor 968 generates outputs 970 to positioning winches that cause smart winches to extend and retract positioning cables as needed to move the water turbine. Extendable legs, buoyancy chambers, and other components may also be controlled by smart winch processor 968. Extendable legs may be operated by positioning winches or other such mechanism and may receive commands from position control system 900).

Figure 10:
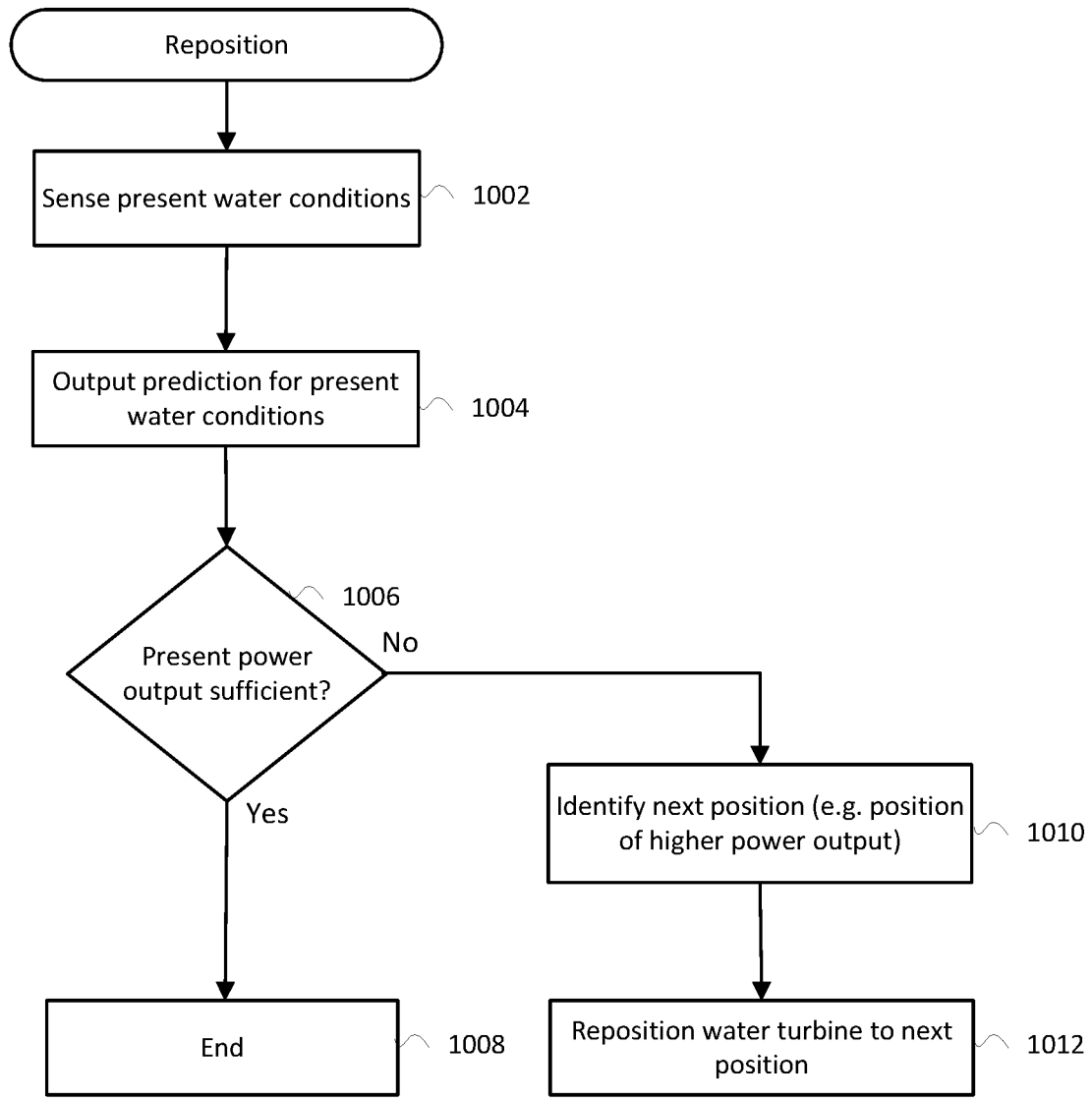
FIG. 10 illustrates an example of a method of repositioning a water turbine.

FIG. 10 illustrates an example of how repositioning of a wave turbine may be efficiently carried out. Present water conditions are sensed 1002 (e.g. wave amplitude, wave length, wave frequency, water current velocity, water current direction, etc.). Output prediction is made for present water conditions 1004. For example, a model, such as a model based on previously-collected data, may be used to determine, given the present water conditions, what is the likely water turbine power output at various locations in the area of operation (in the area within which the wave turbine can be moved using positioning winches). A determination 1006 is made as to whether the power output at the present position is sufficient. If the present power output is sufficient then repositioning may end 1008 (i.e. no repositioning may be needed and the water turbine continues operation in the present position). If the present power output is not sufficient, the next position for the water turbine is identified 1010. The water turbine is then repositioned 1012 (for example, to a position of higher power output so that the water turbine is moved from a position of low predicted power to a position of high predicted power). For example, retractable legs may be retracted and positioning winches may extend and retract positioning cables as commanded by a position control system to position the water turbine at the next position. In some cases, the next position is the position that provides the highest power output for the present conditions. In other cases, a cost-benefit analysis may be performed of any potential repositioning so that long moves to gain small increases in power may be avoided. In some cases, repositioning may be based on predicted conditions over some period in the future and not only on present conditions. Weather forecast information, tidal prediction, and previously recorded data may be used to predict a location that will provide high power output over a period of time (e.g. hours or days).

Figure 11:
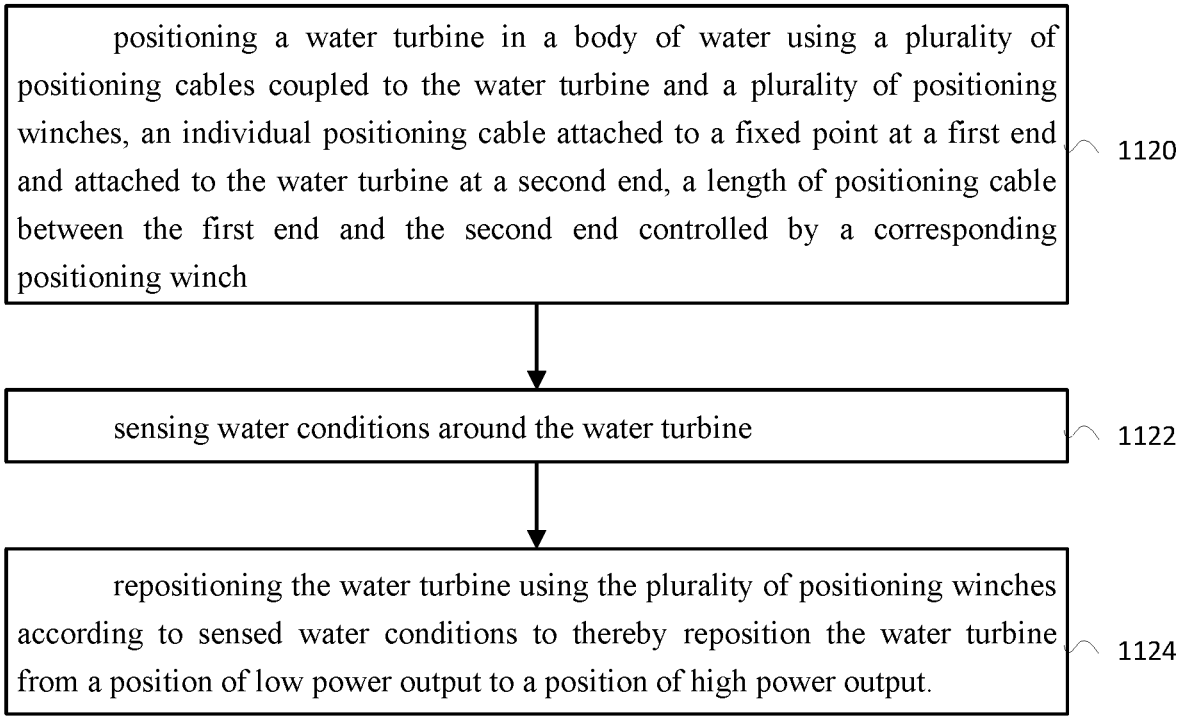
FIG. 11 illustrates an example of a method that includes repositioning a water turbine.

FIG. 11 illustrates a method that includes positioning a water turbine in a body of water using a plurality of positioning cables coupled to the water turbine and a plurality of positioning winches, an individual positioning cable attached to a fixed point at a first end and attached to the water turbine at a second end, a length of positioning cable between the first end and the second end controlled by a corresponding positioning winch 1120. The method further includes sensing water conditions around the water turbine 1122, and repositioning the water turbine using the plurality of positioning winches according to sensed water conditions to thereby reposition the water turbine from a position of low power output to a position of high power output 1124.

Figure 12:
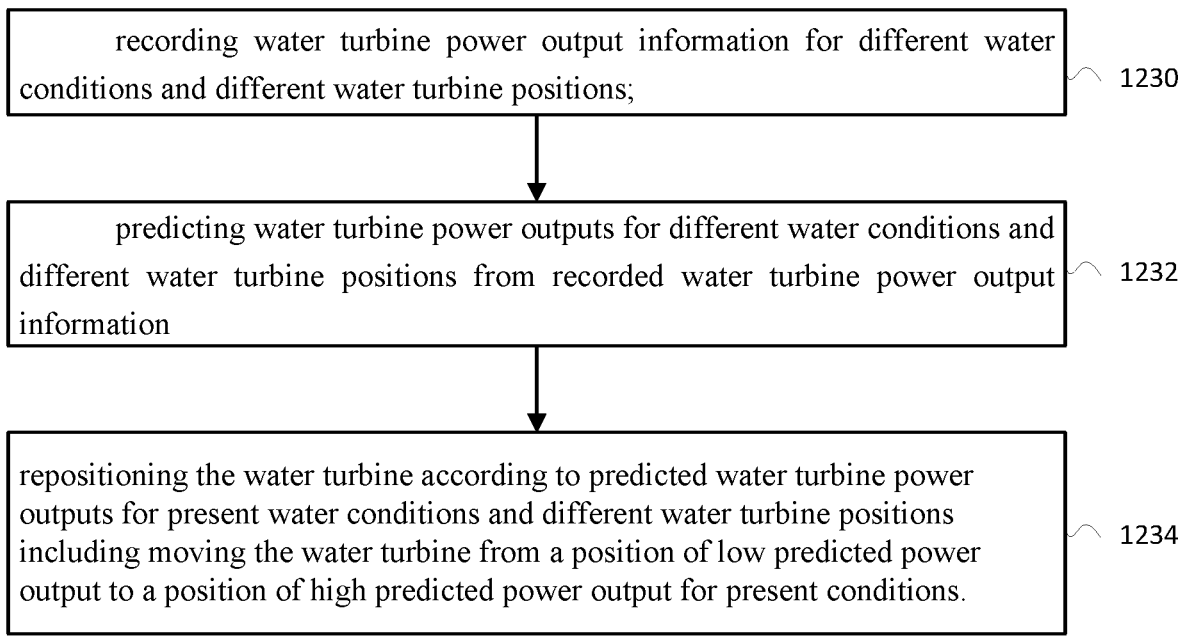
FIG. 12 illustrates another example of a method that includes repositioning a water turbine.

FIG. 12 illustrates a method that includes recording water turbine power output information for different water conditions and different water turbine positions 1230, predicting water turbine power outputs for different water conditions and different water turbine positions from recorded water turbine power output information 1232, and repositioning the water turbine according to predicted water turbine power outputs for present water conditions and different water turbine positions including moving the water turbine from a position of low predicted power output to a position of high predicted power output for present conditions 1234.

Figure 13:
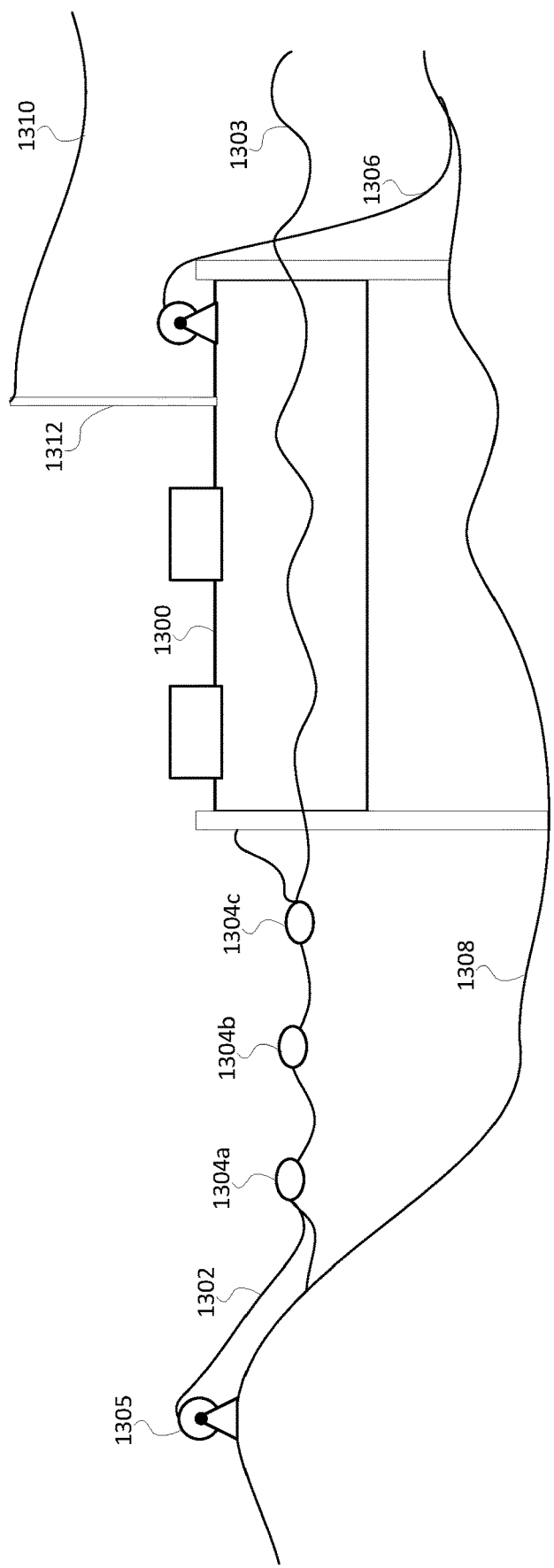
FIG. 13 illustrates an example of a water turbine and floating cable.

FIG. 13 shows an example of a water turbine 1300 with a positioning cable 1302 with floats 1304*a*, 1304*b*, 1304*c* to allow it to float along the surface 1303. Positioning cable is attached to smart winch 1305, which is located on land. In other examples, a cable may float without the addition of floats (e.g. may be made of a material or combination of materials that is/are lighter than water so that the cable floats). In some cases, a foam center may be provided in a cable. On-board attachment points (e.g. on water turbine 1300) and remote attachment points (e.g. on land, sea-floor, rocks, or other location) may be low (close to the water surface 1303) so that cable slack is not excessive. In-line dampers may be provided in floating cables and other cables to reduce impact of changing loads (e.g. due to wave action or other such events). FIG. 13 also shows a cable 1306 that lies on the sea-floor 1308 when not in use. Cable 1306 may be made of a material that is heavier than water so that it sinks and/or may have weights attached to cause it to sink. FIG. 13 shows an example of a power cable 1310 extending from a mast 1312 to a location on land (not shown) to transfer generated power to land.

In some cases, one or more components of a water turbine may be designed to deform, detach, break-away, fold, or otherwise change their configuration under certain conditions. For example, a water turbine used as a wave turbine in an area exposed to waves may encounter wave conditions that could result in damage. Some components may be designed to fold under the force of a large wave rather so that they do not break. For example, a leading edge of a water turbine may be designed to fold down under the force of a large wave. Subsequently, such a component may be restored to its operational position (e.g. using hydraulics, an electric motor, or other actuator to automatically restore it to its previous configuration).

While examples above show wave turbines in locations where they are actively generating power, in some cases, positioning winches in combination with GPS and/or other components may be used to move a wave turbine to a sheltered location (e.g. a port, harbor, inlet, behind breakwater, onto beach, or other such protected location), for example, for protection from bad weather conditions. One or more positioning winches may disconnect from positioning cables (in response to commands from a position control system) to allow a wave turbine to reach such a sheltered location. In some cases, all positioning cables may disconnect and motors (e.g. outboard or inboard motors driving propellers or crawlers engaging the bottom) may be used to move a wave turbine to a safe location.

A wave turbine may store power generated by the water turbine in a power storage module using at least one of: a flywheel, an electrical generator and battery, a water pump and reservoir, and an air compressor and reservoir and the stored power may subsequently be sent to a shore-location. A flywheel may be used to store kinetic energy for different periods of time, for example, between waves to keep the rate of rotation of a generator constant, e.g. regulated through mechanical (or smart) transmission.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the FIG.s may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A system comprising:
a water turbine;
a plurality of positioning winches coupled to the water turbine;
a plurality of positioning cables, a positioning cable of the plurality of positioning cables extending between a fixed point at a first end and the water turbine at a second end and coupled to a corresponding positioning winch that is configured to extend and retract the positioning cable between the fixed point and the water turbine;
a plurality of sensors configured to sense water conditions around the water turbine;
a plurality of retractable legs attached to the water turbine, the water turbine configured to float when the plurality of retractable legs are retracted and the plurality of retractable legs configured to engage a sea-floor surface in an extended position; and
a position control system connected to the plurality of positioning winches and connected to the plurality of sensors, the position control system configured to position the water turbine using the plurality of positioning winches according to the water conditions sensed by the plurality of sensors.

2. The system of claim 1 wherein the plurality of positioning winches are configured in pairs and the position control system is configured to position the water turbine by extending a portion of the positioning cable from a first winch of a pair and retracting a corresponding portion of another positioning cable of the plurality of positioning cables from a second winch of the pair.

3. The system of claim 1 wherein the plurality of sensors are configured to sense at least one of: wave direction and amplitude at one or more locations at or near the water turbine, and wherein the position control system is configured to position the water turbine in at least one of: a location of high sensed wave amplitude and an orientation facing a sensed wave direction.

4. The system of claim 1 wherein the plurality of sensors are configured to sense at least one of: water current velocity and water current direction at one or more locations at or near the water turbine and wherein the position control system is configured to position the water turbine in at least one of: a location of high current velocity and an orientation facing water current.

5. The system of claim 1 wherein the plurality of sensors include one or more acoustic sensors configured to detect foreign objects including at least one of: debris, boats, fish, sea mammals, swimmers, and divers, the system configured to respond to detection of foreign objects by one or more of: an alarm, movement of the water turbine, and shut-down of the water turbine.

6. The system of claim 1 further comprising a Global Positioning System (GPS) circuit connected to the position control system, the GPS circuit configured to provide position information to the position control system.

7. The system of claim 1 further comprising:
a recording circuit configured to record water turbine power output information for different water conditions and different water turbine positions;
a power output prediction circuit configured to predict turbine power outputs for different water conditions and different water turbine positions; and
the position control system configured to position the water turbine according to predicted turbine outputs for present water conditions and different water turbine positions including moving the water turbine from a position of low predicted power output to a position of high predicted power output for present water conditions.

8. The system of claim 1 wherein the retractable legs are further adjustable to vary water turbine height above the sea-floor and wherein the position control system is configured to position the water turbine height using the retractable legs from a height of low predicted power to a height of high predicted power.

9. The system of claim 1 further comprising at least one of: a flywheel, an electrical generator and battery, a capacitor, a water pump and reservoir, and an air compressor.

10. A method of generating power comprising:
positioning a water turbine in a body of water using a plurality of positioning cables coupled to the water turbine and a plurality of positioning winches, a positioning cable of the plurality of positioning cables attached to a fixed point at a first end and attached to the water turbine at a second end, a length of positioning cable between the first end and the second end controlled by a corresponding positioning winch;
sensing water conditions around the water turbine;
retracting a plurality of retractable legs attached to the water turbine for repositioning of the water turbine;
repositioning the water turbine using the plurality of positioning winches according to sensed water conditions to thereby reposition the water turbine from a position of low power output to a position of high power output; and
extending the plurality of retractable legs to engage a sea-floor surface for operation of the water turbine.

11. The method of claim 10 wherein sensing water conditions around the water turbine includes sensing at least one of: wave direction and amplitude at one or more locations at or near the water turbine, and wherein repositioning the water turbine to a position of high power output includes at least one of repositioning to: a location of high sensed wave amplitude and an orientation facing a sensed wave direction.

12. The method of claim 10 wherein sensing water conditions around the water turbine includes sensing at least one of: water current velocity and water current direction at one or more locations at or near the water turbine and wherein repositioning the water turbine to a position of high power output includes at least one of repositioning to: a location of high current velocity and an orientation facing water current.

13. The method of claim 10 further comprising:
recording water turbine power output information for different water conditions and different water turbine positions;
predicting water turbine power outputs for different water conditions and different water turbine positions from recorded water turbine power output information; and
repositioning the water turbine according to predicted water turbine power outputs for present water conditions and different water turbine positions including moving the water turbine from a position of low predicted power output to a position of high predicted power output for present conditions.

14. The method of claim 10 wherein repositioning the water turbine includes varying water turbine height above the sea-floor surface using the retractable legs according to sensed water conditions.

15. The method of claim 10 further comprising storing power generated by the water turbine and subsequently sending stored power to a shore-location.

16. A system comprising:
a water turbine;
a plurality of positioning winches attached to the water turbine;
a plurality of positioning cables, a positioning cable of the plurality of positioning cables attached to a fixed point at a first end and attached to the water turbine at a second end, a length of the positioning cable extending between the fixed point and the water turbine controlled by a corresponding positioning winch;
a plurality of sensors configured to sense water conditions around the water turbine;
a recording circuit configured to record water turbine power output information for different water conditions and different water turbine positions;
a power output prediction circuit configured to predict water turbine power outputs for different water conditions and different water turbine positions from information recorded by the recording circuit;
a position control system coupled to control the plurality of positioning winches to reposition the water turbine from a position of low predicted power output to a position of high predicted power output for present water conditions according to predictions of the power output prediction circuit for present water conditions; and
a plurality of retractable legs attached to the water turbine, the water turbine configured to float when the plurality of retractable legs are retracted, the plurality of retractable legs configured to engage a sea-floor surface in an extended position, the retractable legs are further adjustable in the extended position to vary water turbine height above the sea-floor surface and wherein the position control system is configured to reposition the water turbine height using the retractable legs.

17. The system of claim 16 wherein the plurality of sensors include one or more of: a sea-floor sensor that senses conditions on the sea-floor, a mid-water sensor that senses conditions between the sea-floor and the surface, and a water-surface sensor positioned at or near the surface to sense conditions at the surface of the water, conditions include one or more of water pressure, temperature, salinity, water current velocity and direction.

* * * * *